Jan. 2, 1940.                H. F. TÖNNIES                2,185,934
            PHOTOELECTRIC EXPOSURE DETERMINING APPARATUS
                Original Filed June 18, 1937    2 Sheets-Sheet 1
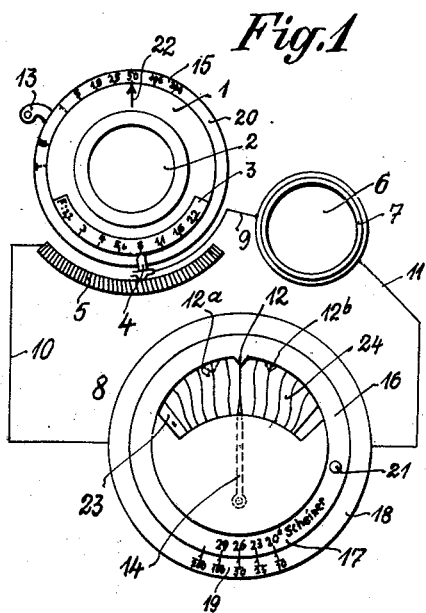
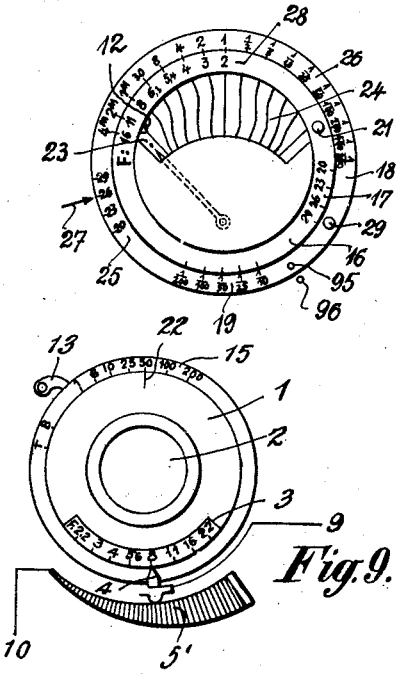
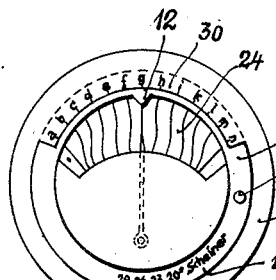
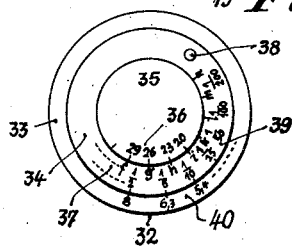
Inventor:
Hans Ferdinand Tönnies,
By Potter, Pierce & Scheffler,
    Attorneys Jan. 2, 1940.   H. F. TÖNNIES   2,185,934
PHOTOELECTRIC EXPOSURE DETERMINING APPARATUS
Original Filed June 18, 1937   2 Sheets--Sheet 2
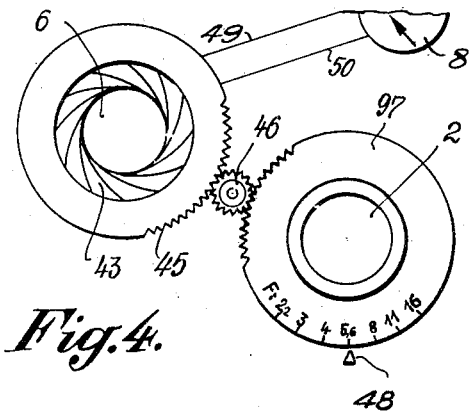
Fig. 4.
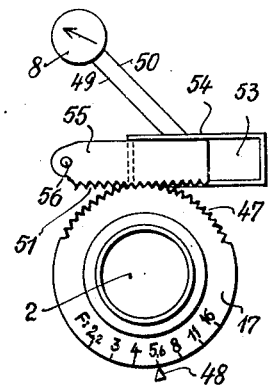
Fig. 5.
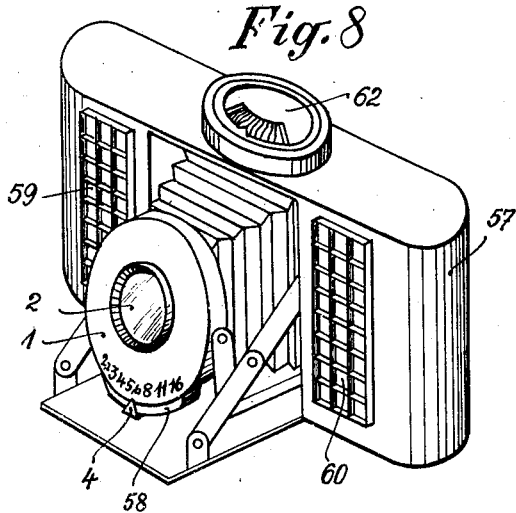
Fig. 8
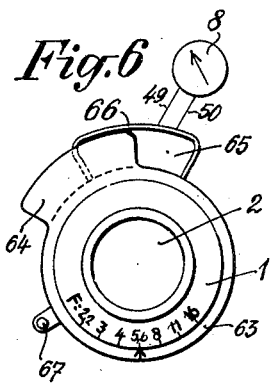
Fig. 6
Fig. 7
Fig. 10.
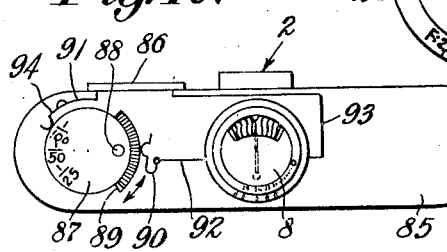
Inventor:
Hans Ferdinand Tönnies
By Potter, Pierce & Scheffler
Attorneys.

Patented Jan. 2, 1940

2,185,934

UNITED STATES PATENT OFFICE 2,185,934

PHOTOELECTRIC EXPOSURE DETERMINING APPARATUS

Hans Ferdinand Tönnies, Hamburg-Gross-flottbek, Germany

Application June 18, 1937, Serial No. 149,019
Renewed August 18, 1939. In Germany July 1, 1936

19 Claims. (Cl. 95—10)

The invention relates to photoelectric apparatus for determining the appropriate adjustment to be given the shutter of a photographic or cinematographic camera, the apparatus including a galvanometer actuated by a photocell. Preferably a photocell is used which automatically generates an electric current from light.

An object of this invention is to provide photoelectric exposure determining apparatus of the type including a photoelectric cell, a measuring instrument, and a computer including members that are angularly adjustable on the instrument casing, one member carrying a fiducial mark that is to be adjusted in accordance with the deflection of the instrument pointer when light from the area to be photographed falls on the photoelectric cell. An object is to provide apparatus of this kind which is constructed in such a way that it can be assembled on the photographic camera without alteration of the important parts of the latter, and that it may be attached to a camera also after the same has been completely finished, for example to a camera which is already in trade.

A further object of the invention is to make the measuring instrument or galvanometer accurately correspond to the shutter and to the plate speed by altering accordingly the position of a mark to which the needle of the galvanometer will be pointed by actuating an electrical or optical resistance that is connected to or otherwise adjusted in accordance with the setting of a part of the shutter mechanism.

A further object of the invention is to provide exposure determining apparatus that may be coupled to the shutter of a camera but may also be used as an ordinary exposure meter, the apparatus including a photoelectric cell and a measuring instrument having adjustable indicator members bearing different marks or scales for use when the apparatus is used as an exposure meter or alternatively as a controlling device for the shutter.

These and other objects and advantages of the invention will be apparent from the following specification when taken with the accompanying drawings, in which:

Fig. 1 is a diagrammatic front elevation of an embodiment of the device;

Figs. 2 and 3 are front elevations of other embodiments of the invention;

Figs. 4, 5, 6 and 7 show further embodiments of the invention, the device being supplied with optical means to alter the strength of the electric current instead of by an electric resistance;

Fig. 8 is a perspective view of a camera, supplied with the device;

Fig. 9 is an embodiment of the invention in which an electrical resistance of particular shape is used;

Fig. 10 is a top elevation of a camera supplied with the device.

All figures are diagrammatic.

In Fig. 1 the numeral 1 identifies the shutter casing of the camera objective and the numeral 2 the objective itself. 3 is a scale attached to the shutter in the usual way, the numbers on it indicate the sizes of the diaphragm of the objective, which can be set by moving the lever 4. The lever 4 is supplied with a spring contact that is moving along the electrical resistance 5. The electrical current is generated by a photocell 6 which is housed in the casing 7. The current takes its way along the lines 9, 10 and 11 to the galvanometer 8. On the shutter is furthermore shown a turntable ring 20 carrying a scale of exposure times 15, a mark 22 and a lever 13. The shutter is employed in the usual way, i. e. the times of exposure are controlled by setting the respective numbers of the scale 15 over the mark 22 in turning the ring 20. By pressing down the lever 13 the mechanism of the shutter is actuated. The numeral 14 indicates the needle of the galvanometer which points to the mark 12 in accordance to the guide lines of the scale 24. 23 is a mark corresponding to the position of the needle when no current flows through the galvanometer. The galvanometer is supplied with two rings 16 and 18. The ring 18 is fixed. The ring 16 carries a mark 12 and can be turned by a knob 21. The ring 16 carries a scale 17 of plate speeds and the ring 18 a scale 19 of exposure times.

Firstly the time of exposure is selected by setting the corresponding number over the mark 22, for example number "50" (meaning one fiftieth of a second) over the mark 22. Then the plate speed is set over the corresponding time of exposure on ring 18 by turning ring 16, mark 1/50 over 26 (degrees Scheiner), whereby the mark 12 comes into the position shown in Fig. 1. Now the camera is directed towards the object to be photographed so that the light from there falls upon photocell 6 and the lever 4 is turned so much to the left or the right, thereby altering the strength of the electric current generated by the photocell 6, that the needle 14 points towards the mark 12. Hereby the diaphragm of the lens has been given the proportionate opening, the opening F:8 as shown in Fig. 1. The electric current is forced to flow through a longer or shorter part of the resistance 5 in accordance to the position of the lever 4.

Now it is very important to have simple means by which can be taken into consideration the two factors of the plate speed and of the exposure times. If the exposure time selected is a different one, say 1/10 of a second, the light emanated from the object and consequently the current generated by the photocell may be smaller than in the first case, provided the same diaphragm (F:8) is used. In this case the mark 12 has to be given a different position, so that it comes into the position 12a. This position is given to the mark by turning the ring 16 accordingly. The needle 14 is then pointed to the mark with the help of the corresponding guide line of the scale 24. If on the other hand 1/200 of a second is chosen the mark 12 has to be turned into the position 12b. The plate speeds marked on the ring 16 may be taken in this way likewise into consideration. The scales of the ring 16 and 18 can of course be exchanged without altering the result. Also further scales may be used for the purpose of altering the position of the mark 12 adequately, such as a scale indicating the absorption of yellow light screens arranged before the objective lens.

Fig. 2 shows a modification by which the galvanometer is supplied with scales additional to those employed when the device is linked electrically with the shutter. The ring 18 in this modification is not fixed but turnable and is supplied with a scale of plate speeds 25 and a scale of exposure times 26 in addition to the scale 19 of exposure times. Opposite the scale 25 is positioned a fixed mark 27. The ring 16 carries the scale 17 of plate speeds and also a scale 28 of diaphragms. The ring 18 may be turned by means of a knob 29.

The scales 17 and 19 are used when the device is electrically linked to the shutter or used as a shutter control, the scales 25, 28 and 26 are used when the device is used as an instrument independent of the shutter.

The function of this device is as follows. For using it as an independent instrument the lever 4 is positioned opposite the diaphragm value f 2.2 or a little farther to the left, so that the current does not pass through the resistance but only through the wires 9 and 10. The respective degree of the emulsion speed is set opposite the mark 27 by turning the ring 18 accordingly. Then the mark 12 is set opposite the position of the needle 14 in accordance to the guide lines 24 by a turn of the ring 16. The scales 26—28 will then have the correct position opposite each other, i. e. the times of exposure and the numbers of the diaphragm will be related to each other in the proper way, so that they can be selected for the exposure as preferred. The parts of the shutter will then be set by hand in accordance to the indications of these scales. Instead of the mark 27 a scale of marks may be arranged which may be used for exposures with yellow or green screens and for exposures by artificial light. If the device is used as a shutter control by employing the variable resistance the mark 95 has to be brought opposite the fixed mark 96 first, then the plate speed of scale 17 is brought correctly over scale 19 and after this the resistance is actuated.

The electric connection with the device will usually be switched off only when the light emanated from the object is too weak to bring the needle opposite the respective position of the mark 12, that is, for time exposures to be made indoors.

Fig. 3 shows another modification of the invention. The ring 17 of the galvanometer is turnable and on the fixed ring 18 a scale of marks such as the letters a, b, etc., is arranged on a flange that is overlapping the ring 16. If the device is electrically linked to the shutter, the device is used in the same way as described at Fig. 1. If the electric connection between the shutter and the device is interrupted in order to use it as an ordinary exposuremeter that letter of the scale 30 is to be taken into mind to which the needle points along the guide lines 24. In addition to the galvanometer a computer 32 is arranged. The computor consists of a fixed centerplate 35, a fixed ring 33 and a turnable ring 39. The plate 35 is supplied with a scale of plate speeds, the ring 33 with a scale of diaphragms and the ring 34 with a scale of letters, similar to those on the scale 30 upon the galvanometer, and a scale 39 of times of exposure. The function of this computer is the following. That letter of the scale 30, to which the needle 14 pointed and which was taken into mind, has to be selected on plate 39 and brought opposite the plate speed on plate 35 by a turn of the ring 34. The times of exposure of scale 39 and the diaphragms of scale 40 are brought hereby into the proper position towards each other. The electric resistance may be arranged in the main electric current generated by the photocell or in a branch of the current.

Figs. 4 to 7 show in different embodiments optical screens related to the shutter instead of the electrical resistance.

The plate 97 of the shutter is partly cogged. By turning this plate the diaphragms inside the shutter are set in correspondence to the indication of the pointer 48. The movement of the plate is transferred by the cogged wheel 46 and the cogs 45 to the iris-diaphragm 43, behind which the photocell 6 is located. The electric current generated by the photocell is conducted through the wires 49—50 to the galvanometer 8. The more or less the plate 97 is turned, hereby altering the opening of the diaphragm, the more or less the iris-diaphragm 43 is opened or closed, hereby inducing the photocell 6 to generate a current of coresponding strength that is indicated by the galvanometer 8. The function of the iris-diaphragm consequently corresponds to the electric resistance shown in Fig. 1.

In Fig. 5 the arrangement is somewhat different. To the cogged plate 47 is related the cogged plate 55 which may be moved in the casing 54 by means of the knob 56, thereby covering or exposing more or less of the photocell 53. The principal function of the device is consequently similar to that shown in Fig. 4.

Fig. 6 shows an embodiment of the device by which more or less of the photocell 65 cased in a housing 66 is covered by a plate 64 that is attached to the ring 63, which can be turned by the knob 67 and by the turning of which the size of the diaphragm of the shutter is determined at the same time.

Fig. 7 shows a similar arrangement in which the photocell 80 has an irregular shape. The photocell will be more or less covered by the plate 64 by turning the ring 81. Hereby also the size of the diaphragm is determined. The photocell 80 has received an irregular shape in order to let the electric current generated by it better correspond to the setting of the diaphragm, because the numbers of the diaphragm show a geometric progression in which the light value of each number is double that of the next number to the right.

Fig. 8 shows in which way the whole device may be assembled on a photographic camera. The electric resistance below the shutter 1 is indicated by the number 58. 59 and 60 indicate two photocells that are fastened upon the body of the camera and in front of which are arranged chamberlike partitions, by the walls of which light that is coming too much from the sides is screened off from the photocells. By means of this construction the screening device before the photocell can be made very low, in order to prevent that the camera may become too bulky. The galvanometer 62 is placed upon the topside of the camera.

Fig. 9 shows a development of the invention by which the whole device is made more efficient in that it functions more correctly. Because the single stops of the diaphragm form a geometric progression in which one value is double as great as the next one to the right the resistance 5' has received a coordinated shape by which the power of resistance is changed in the same progressive way. This can be done as shown in Fig. 9 by giving the resistance a shape that is growing broader to one end. The same result can be obtained by using a shape that is of uniform dimension as shown in Fig. 1, but by composing the single parts of it of material of different resistance power.

Fig. 10 shows a certain embodiment of the invention in accordance to which the resistance 89 is attached to a revolving plate 87. By the revolution of the same the shutter speed is set. Upon the resistance 89 a spring contact 90 is sliding, the numeral 8 indicates the galvanometer, 85 the body of the camera, 88 a knob by which the plate 87 may be turned, 2 the objective, 86 the casing of the photocell and 91, 94, 92 and 93 the connections of the electric current. The position of the spring 90 is fixed and the resistance 89 is moving along the spring when the disk 87 is revolved.

By the drawings the embodiments of the invention are shown only diagrammatically and there are many alterations possible without departing from the spirit of my invention.

Instead of connecting the electrical or optical means, by which the strength of the electric current is altered, to that part of the shutter by which the size of the diaphragms is determined, these means can also be connected to that shutter part by which the times of exposure are determined.

Because the device will preferably be used as a shutter control for snap-shots or automatically timed exposures up to 1 second, it is very important to have the device constructed so that it also can be used as an independent exposure-meter. Hereby the range of use of the device is much enlarged. A control device of the type in which the galvanometer displacement is affected by the shutter adjustment can be used only for snapshots, chiefly because the shutter mechanism can only be set for the automatic timing of snap-shots, whereas time-exposures are always to be made by hand and the exposure data for time exposures can be obtained when the galvanometer is not controlled by the shutter adjustment.

What I claim is:

1. A photoelectric exposure meter comprising a photoelectric cell, a measuring instrument including a casing housing a movable pointer, means electrically connecting said cell and said instrument, and controlling means adjustable to determine the magnitude of the pointer displacement for a given light intensity at the photoelectric cell; said instrument having an indicator member movably mounted on the instrument casing and carrying a mark for cooperation with the pointer, a scale of graduations on said movable member and a cooperating relatively stationary scale of graduations carried by the instrument casing, said scales corresponding to graduations of the light sensitivity of films and to one of the factors, viz. shutter speed and diaphragm opening, affecting the quantity of light passing through a camera objective, whereby the adjustment of said indicator member to aline the scale graduations of the selected film and exposure factor value sets the mark of said indicator member in a predetermined position and the value of the second of said factors for a given light intensity at the cell is determined by that adjustment of said controlling means which brings the pointer into line with said mark.

2. A photoelectric exposure meter as claimed in claim 1, wherein said instrument has a stationary scale marked with a plurality of guide lines that extend between the path of movement of the end of the pointer and the path of movement of the mark of said indicator member.

3. In apparatus of the type described; photoelectric exposure determining means comprising a photoelectric cell, an electrical measuring instrument connected to said cell, and means for adjusting the current delivered by said cell to said instrument in accordance with the values of one of the exposure factors of diaphragm opening and shutter speed; said instrument including a casing housing a pointer movable in response to the current flow in said instrument, a movable indicator member having a mark for cooperation with said pointer and a scale of graduations, a second member on said instrument casing and carrying a scale of graduations for cooperation with those of the movable indicator member, said scales corresponding to graduations of the other of said exposure factors and to graduations corresponding to the light sensitivity of the film to be exposed.

4. The invention as claimed in claim 3, wherein said means for adjusting the cell output current has graduations of diaphragm openings, and the scales of the indicator members are graduated in film speeds and shutter speeds.

5. The invention as claimed in claim 3, wherein said means for adjusting the cell output current has graduations of shutter speeds, and the scales of the indicator members are graduated in film speeds and diaphragm openings.

6. A photoelectric exposure meter comprising a photoelectric cell, a measuring instrument including a casing housing a movable pointer, means electrically connecting said cell and instrument, and controlling means adjustable to determine the magnitude of the pointer displacement for a given light intensity; said instrument having a pair of relatively movable indicator members adjustably mounted on the instrument casing, cooperating scales of graduations of diaphragm openings and shutter exposure times on said indicator members, an index mark carried by one of said members for cooperation with said pointer, and means including an index mark and film speed graduations on the instrument casing and the other adjustable member; whereby exposure data may be read from the alined graduations of said cooperating scales of the indicator members when the first member is adjusted to aline its index mark with the instrument pointer, the second member is adjusted to aline the appropriate film speed graduation with the cooperating index mark, and the controlling means is adjusted to a predetermined position.

7. A photoelectric exposure meter as claimed in claim 6, in combination with scale means for indicating graduated values of one of the exposure factors of diaphragm openings and shutter speeds for different adjustments of said controlling means, and cooperating scales of film speeds and of the other of said exposure factors on said adjustable indicator members for setting the index mark of the first adjustable member to positions corresponding to the selected values of film speed and of the second exposure factor, whereby the corresponding value of the first exposure factor for the existing scene brightness may be read from said scale means when the controlling means is adjusted to aline the pointer with the index mark of said adjustable member.

8. The invention as claimed in claim 1, wherein said second member is movably mounted on the instrument and indices are provided on said second member and the instrument casing to indicate the correct preliminary adjustment of said second member for the subsequent setting of the movable indicator member, in combination with auxiliary scale graduations adapting the exposure determining means for use at low light intensities when said current-adjusting means is set to an inoperative position; said auxiliary scale graduations comprising graduations on said second member and instrument casing for setting said second member in accordance with the light sensitivity of the film, and cooperating graduations of shutter speeds and diaphragm openings on said movable indicator member and second member respectively, said cooperating graduations being positioned to indicate appropriate exposure data when the movable indicator member is adjusted to bring the mark thereof into alignment with the instrument pointer.

9. In an exposure meter, the combination with a photoelectric cell, a measuring instrument within a casing and connected to said cell, said instrument having a pointer movable along the inner edge of a scale plate bearing a plurality of outwardly extending guide lines, of indicator means for cooperation with said instrument pointer; said indicator means comprising a pair of individually movable indicator members angularly adjustable about a common axis and each having a portion thereof located beyond the outer edge of the scale plate, a fiducial mark on one of said indicator members and movable thereby along the outer edge of the scale plate for alinement with the instrument pointer, cooperating indicia on said indicator members indicative of different values of at least one exposure factor at each angular adjustment of said members with respect to each other, and a second set of cooperating indicia including a scale graduated in values of another exposure factor and movable by the second indicator member with respect to the casing, the other of said indicia of the second set being in fixed position on the instrument casing.

10. In an exposure meter, the invention as claimed in claim 9, wherein said indicator members are concentric rings.

11. In an exposure meter, the invention as claimed in claim 9, wherein said cooperating indicia on said indicator members are scales graduated in values of exposure time and diaphragm opening.

12. In an exposure meter, the combination with a photoelectric cell, a measuring instrument within a casing and connected to said cell, said instrument having a pointer movable along an edge of a scale plate bearing a plurality of guide lines, of indicator means for cooperation with said instrument pointer to indicate simultaneously the sets of complementary values of diaphragm opening and exposure time appropriate for a selected film speed value and the measured scene brightness; said indicator means comprising a pair of indicator members angularly adjustable about a common axis, a fiducial mark on one indicator member for movement thereby along the other edge of the scale plate into alinement with the guide line indicated by said instrument pointer, and indicia on the second of said adjustable indicator members for cooperation with indicia on the casing and the first adjustable indicator member, one set of cooperating indicia being scales graduated in values of the factors of diaphragm opening and exposure time, and the other set of cooperating indicia being a setting mark and a scale of film speed values, whereby various appropriate combinations of complementary diaphragm openings and exposure times may be read from said first set of cooperating indicia when the second adjustable indicator member is adjusted to set the second set of cooperating indicia in accordance with the selected film speed and the fiducial mark of the first adjustable indicator member is alined with the scale plate guide line indicated by the instrument pointer.

13. In an exposure meter, the invention as claimed in claim 12, wherein the pointer moves along the inner edge of the instrument scale plate, the fiducial mark of the first adjustable indicator member moves along the outer edge of the scale plate and the second adjustable indicator member is of ring form and extends about the instrument scale plate.

14. In an exposure meter, the invention as claimed in claim 12, wherein said first set of cooperating indicia includes a graduated scale on the first adjustable indicator member.

15. In an exposure meter, the invention as claimed in claim 12, wherein said first set of cooperating indicia includes a graduated scale on the first adjustable indicator member, and the second set of cooperating indicia includes a scale of film speed values on the second adjustable indicator member and a setting mark on the casing.

16. In an exposure meter, the combination with a casing housing a photoelectric cell and a measuring instrument, said instrument being connected to said cell and having a pointer movable along the inner edge of a scale plate bearing a plurality of outwardly extending guide lines; of a computer mounted on said casing; said computer comprising two angularly adjustable members and a member carried by the casing, a fiducial mark on one of said adjustable members for movement along the outer edge of said scale plate into line with the guide line indicated by said instrument pointer, a scale on the other adjustable member graduated in values of one of the factors of exposure time and diaphragm opening, a cooperating scale graduated in values of the other of said factors on another member of said computer, and cooperating indicia on said second adjustable member and that member of said computer that does not carry a graduated scale for setting said second adjustable member in different angular relations in accordance with the emulsion speed values.

17. In an exposure meter, the combination with a casing housing a photoelectric cell and a measuring instrument, said instrument being connected to said cell and having a pointer movable along the inner edge of a scale plate bearing a plurality of approximately radial guide lines, of a computer mounted on said casing comprising two angularly adjustable indicator members and an indicator member carried by the casing, a fiducial mark carried by one adjustable indicator member for movement along the outer edge of said scale plate for alinement with the guide line indicated by the instrument pointer, the other adjustable indicator member being a ring, cooperating scales graduated in the factors of diaphragm opening and exposure time on said ring and another indicator member, and cooperating indicia on said ring and the third of said indicator members for setting the same in different angular relations in accordance with film speed values, whereby various combinations of diaphragm openings and exposure times may be read from said cooperating scales when the ring and third member are adjusted for the selected film speed and said fiducial mark is alined with the guide line indicated by said instrument pointer.

18. In an exposure meter, the combination with a casing housing a photoelectric cell and a measuring instrument, said instrument being connected to said cell and having a pointer movable along the inner edge of a scale plate bearing a plurality of approximately radial guide lines, of a computer mounted on said casing; said computer comprising two angularly adjustable indicator members and a member carried by the casing, a fiducial mark carried by one indicator member for movement along the outer edge of said scale plate for alinement with the guide line indicated by the instrument pointer, the other indicator member being a ring, cooperating scales graduated in the factors of diaphragm opening and exposure time on said ring and one of the other members, and a scale of film speed values on said ring for cooperation with an index mark on the third of said members for setting the ring and said third member in different angular relationships.

19. In an exposure meter, the combination with a casing housing a photoelectric cell and a measuring instrument, said instrument being connected to said cell and having a pointer movable along the inner edge of a scale plate bearing a plurality of guide lines that extend outwardly from the pointer, of computer means mounted on said casing for directly indicating various diaphragm opening-exposure time combinations for a measured scene brightness and a selected film speed value; said computer means comprising a ring-shaped indicator member encircling the outer edge of said scale plate, said member carrying circumferentially spaced scales of film speed and of one of the factors of diaphragm opening and exposure time, a second indicator member, means supporting said indicator members for angular movement on said casing and with respect to each other, a fiducial mark on said second indicator member for alinement with the outer end of that scale plate guide line which is in line with the instrument pointer, and indicia on the casing and second indicator member for cooperation with the scales of said ring-shaped indicator member, one of said indicia being a scale graduated in the other of said factors of diaphragm opening and exposure time, and the other of said indicia being a mark for alinement with the selected value of film speed on the graduated scale of the ring-shaped indicator member.

HANS FERDINAND TÖNNIES.